United States Patent Office 3,235,774
Patented Feb. 15, 1966

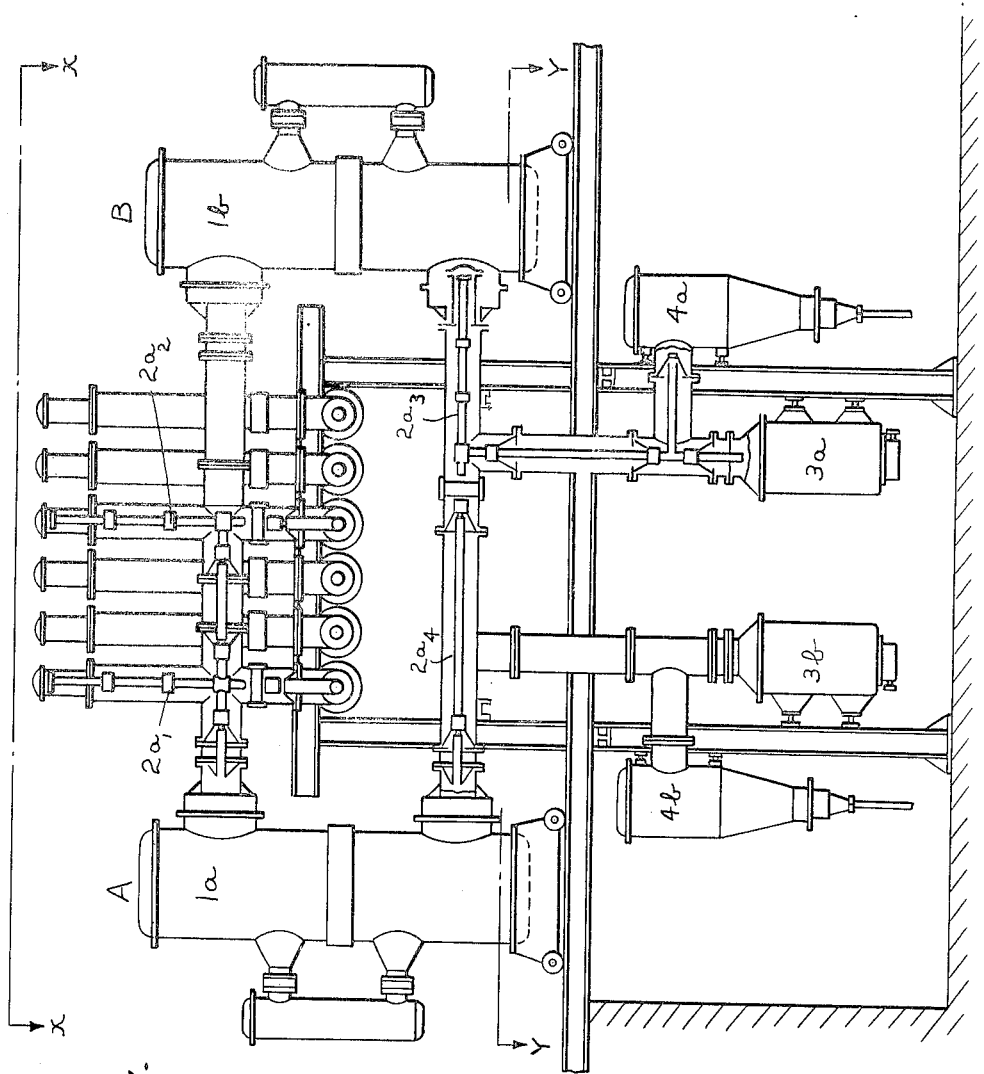

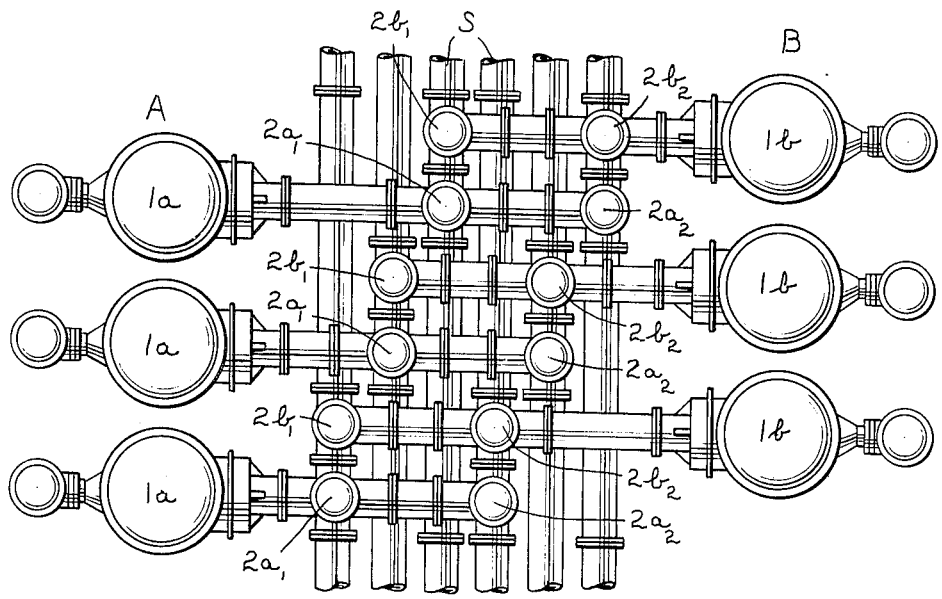
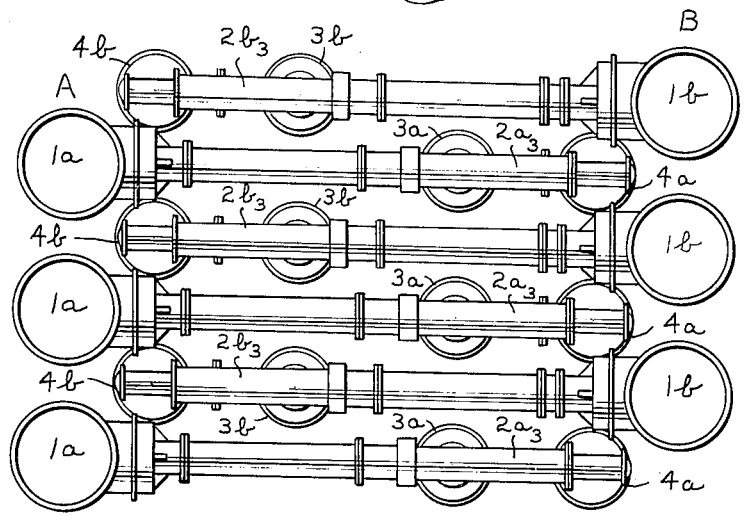
INVENTOR
Egbertus A. Frowein

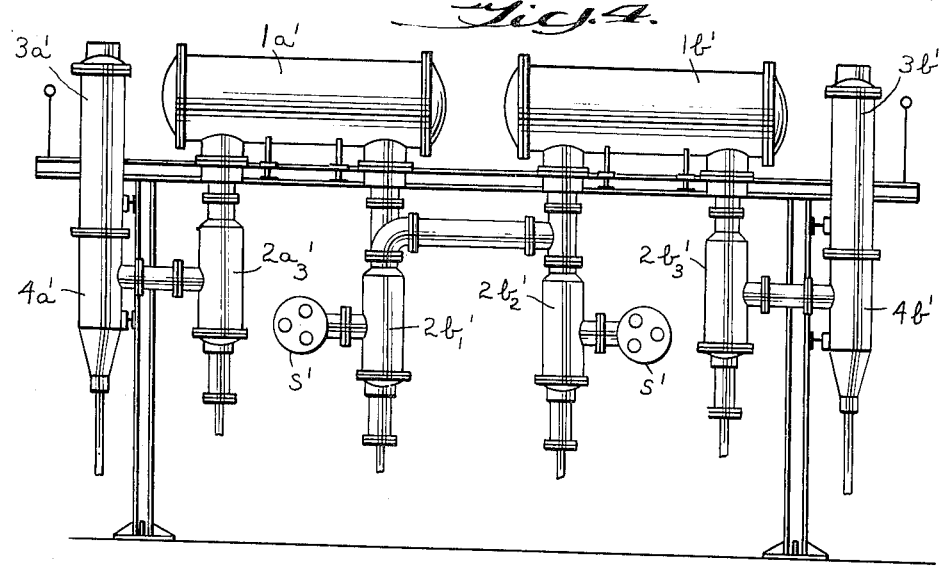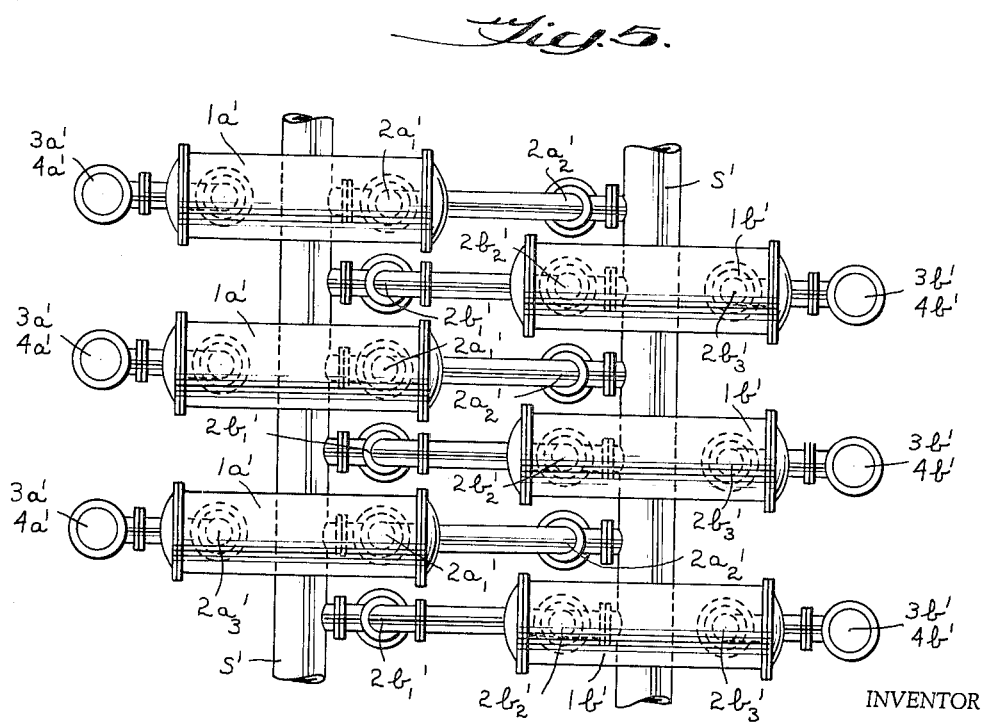

3,235,774
METALCLAD SWITCHGEAR IN DOUBLE-UNIT CONSTRUCTION
Egbertus A. Frowein, Nussbaumen, Aargau, Switzerland, assignor to Aktiengesellschaft Brown, Boveri & Cie., Baden, Switzerland, a joint-stock company
Filed June 28, 1962, Ser. No. 205,997
Claims priority, application Switzerland, June 30, 1961, 7,682/61
3 Claims. (Cl. 317—103)

The present invention concerns metalclad switchgear plants with pressure gas or oil insulation built according to the double-unit type of construction. Such a plant comprises two three-phase bus bar systems, the respective bus bar isolating switches, heavy duty switches, cable separators, cable terminals and possibly also voltage transformers. The enclosures for the bus bars can be separate for each phase, or common for all phases, all other components being enclosed single-phase. Two bus bar isolating switches, which belong to corresponding phases of the two three-phase bus bar systems, and an associated heavy duty switch with its outlet establish one pole. Three poles of different phases establish a unit. It is known to arrange these units at both sides of the bus bars. Two such opposite units establish a double-unit. In such plants the circuit breakers of the individual units are located in a relatively wide casing, whilst the accompanying voltage isolating switches which are generally built on are situated in a relatively narrow casing.

In such plants a space-saving construction is of great importance. Above all it is necessary that such plants should not attain too great a width. At the same time accessibility during erection and also for subsequent servicing should not be impaired.

In accordance with the invention the poles of one such double-unit are arranged alternately to the right and left toward the center of the bus bar system in such a manner that the casings for the isolating switches for the several poles of one unit are nested within the casings for the isolating switches of the several poles of the other unit.

The invention is explained in detail by means of constructional examples shown in the drawings.

FIG. 1 shows a switchgear plant in lateral elevation with the circuit breakers in the vertical position.

FIGS. 2 and 3 are essentially plan views of this plant at two different heights on FIG. 1 at X—X and Y—Y, respectively.

FIGS. 4 and 5 show a lateral elevation and plan view of a switchgear plant with horizontal circuit breakers.

In FIG. 1 showing a lateral view of the switchgear, $1a$ and $1b$ are the vertically arranged encased circuit breakers of the units A and B. These circuit breakers have relatively wide casings. $2a_1$ and $2a_2$ are the encased isolating switches which are mounted on the circuit breakers $1a$ of the phases of the three-phase unit (A) at an upper level $x$—$x$. The circuit breakers for breaking the heavy load current are electrically connected in series with the voltage isolating switches in the conventional manner. These voltage isolating switches have a narrow casing when compared with that of the circuit breakers. An additional encased voltage isolating switch $2a_3$ is mounted on each of the circuit breakers $1a$ by means of a connecting element $2a_4$ at the lower level $y$—$y$. Voltage transformers $3a$ as well as cable end boxes $4a$ are also mounted on the encased isolating switches $2a_3$.

FIG. 2 shows a plan view of this plant, $1a$ and $1b$ being again the vertical circuit breakers of both units (A and B). Here $2a_1$ and $2a_2$ are the encased isolating switches located at an upper level and leading to the busbars of system S. The encased isolating switches $2b_1$ and $2B_2$ of the circuit breakers $1b$ of the three-phase unit B are arranged in the opposite direction to the isolating switches $2a_1$ and $2a_2$ and interposed with respect to the latter. These isolating switches $2b_1$ and $2b_2$ are also mounted in a corresponding manner on the wide casings of the circuit breakers $1b$ of the three-phase unit B.

FIG. 3 shows in plan view the isolating switches $2a_3$ and $2b_3$ which lie at a lower level and are also mutually interposed and arranged in opposite directions. They are connected to the voltage transformers $3a$ and cable end boxes $4a$ and $3b$, $4b$ respectively.

By means of this arrangement a compact construction is obtained where the accessibility of the individual elements of the apparatus is not detrimentally affected.

FIGS. 4 and 5 show a switchgear plant in lateral elevation and plan respectively where elevated and horizontally arranged circuit breakers $1a'$ and $1b'$ with wide casings are used. On these latter the narrow casings of the isolating switches of the individual three-phase units are oppositely directed and mutually interposed in essentially the same manner as are the isolating switches associated with the circuit breakers in the construction according to FIGS. 1–3. Here $2a_1'$ and $2a_2'$ are the isolating switches associated with the circuit breakers $1a'$ of one three-phase unit and which lead to the busbars of system S'. A further isolating switch $2a_3'$ is mounted on each circuit breaker $1a'$ and each of the latter isolating switches is connected with a voltage transformer $3a'$ as well as a cable end box $4a'$. In a similiar manner $2b_1'$ and $2b_2'$ are the isolating switches associated with circuit breakers $1b'$ of the other three-phase unit and which also lead to busbars of system S'. A further isolating switch $2b_3'$ is mounted on each circuit breaker $1b'$ and each of the latter isolating switches is connected with a voltage transformer $3b'$ as well as a cable end box $4b'$.

As in the previously described embodiment, the isolating switches $2a_1'$ and $2a_2'$ associated with the circuit breakers $1a'$ are arranged in the opposite direction to the isolating switches $2b_1'$ and $2b_2'$ associated with the circuit breakers $1b'$ and are interposed with respect to the latter isolating switches.

I claim:

1. A metalclad switchgear plant comprising two three-phase longitudinally extending bus bar systems arranged parallel to each other, first and second three-pole switching units, each pole of said first and second units comprising a circuit breaker and two isolating switches for connecting the same to corresponding phases on said two bus bar systems, said circuit breakers being contained in relatively wide casings and said isolating switches being contained in relatively narrow casings, the respective poles of said first and second switching units being arranged alternately to the right and left toward the center of said two bus bar systems such that the casings for the isolating switches of the three poles of said first switching unit are located in overlapping relation with respect to and interposed between the casings for the isolating switches of the three poles of said second switching unit.

2. A metalclad switchgear plant as defined in claim 1 wherein the casings for said circuit breakers and the casings for said isolating switches are disposed vertically.

3. A metalclad switchgear plant as defined in claim 1 wherein the casings for said circuit breakers are disposed horizontally and the casings for said isolating switches are disposed vertically.

References Cited by the Examiner
UNITED STATES PATENTS

| | | | |
|---|---|---|---|
| 1,787,053 | 12/1930 | Rossman | 317—103 |
| 2,288,650 | 7/1942 | Rossman | 317—103 |
| 2,379,188 | 6/1945 | Rugg | 317—103 |

KATHLEEN H. CLAFFY, *Primary Examiner.*
JOHN F. BURNS, *Examiner.*